(12) United States Patent
Spector et al.

(10) Patent No.: US 11,836,710 B2
(45) Date of Patent: *Dec. 5, 2023

(54) SYSTEMS AND METHODS FOR FACILITATING PAYMENT APPLICATION PROVISIONING AND TRANSACTING

(71) Applicant: JPMORGAN CHASE BANK, N.A., New York, NY (US)

(72) Inventors: Howard Spector, Woolwich, NJ (US); Scott H. Ouellette, Kingston, NH (US); Brian J. Smyth, West Chester, PA (US); Christina Sheppard, Mamaroneck, NY (US); Gavin C. Michael, New York, NY (US); Sih Lee, Northvale, NJ (US); Kelly Dempski, Berkeley, CA (US); Tim J. Parsey, Los Altos, CA (US); Andrew Sloper, Surbiton (GB); Ken Wimberely, San Rafael, CA (US); Laura X. Wang, New York, NY (US); Shadman Zafar, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 227 days.

This patent is subject to a terminal disclaimer.

(21) Appl. No.: 17/110,242

(22) Filed: Dec. 2, 2020

(65) Prior Publication Data

US 2021/0081929 A1 Mar. 18, 2021

Related U.S. Application Data

(63) Continuation of application No. 15/131,979, filed on Apr. 18, 2016, now Pat. No. 10,878,407.
(Continued)

(51) Int. Cl.
*G06Q 40/00* (2023.01)
*G06Q 20/36* (2012.01)
*G06Q 20/40* (2012.01)

(52) U.S. Cl.
CPC ......... *G06Q 20/367* (2013.01); *G06Q 20/405* (2013.01)

(58) Field of Classification Search
CPC .................. G06Q 20/367; G06Q 20/405
See application file for complete search history.

(56) References Cited

U.S. PATENT DOCUMENTS

| | | | |
|---|---|---|---|
| 8,250,662 B1 * | 8/2012 | Zhu | H04W 12/35 726/26 |
| 9,516,487 B2 | 12/2016 | Powell et al. | |

(Continued)

FOREIGN PATENT DOCUMENTS

| | | | |
|---|---|---|---|
| WO | WO-2012091349 A2 * | 7/2012 | G06F 21/34 |
| WO | 2013090011 | 6/2013 | |

(Continued)

OTHER PUBLICATIONS

Anonymous, "App to App Communication," www.sitepoint.com/community 2013 (Year: 2013).*

(Continued)

*Primary Examiner* — Abhishek Vyas
*Assistant Examiner* — William B. Bunker
(74) *Attorney, Agent, or Firm* — GREENBERG TRAURIG LLP (57) ABSTRACT

Systems and methods for facilitating payment application provisioning and transacting are disclosed. According to one embodiment, a method for provisioning a token to a third party payment application on a mobile device may include (1) receiving a logon from a customer using a mobile application for a financial institution executed on a mobile (Continued)

device and a device identifier for the mobile device; (2) receiving a request to provision a token for a third party payment application; (3) authenticating the customer using the logon information and the device identifier; (4) provisioning a token for a payment device associated with the customer; and (5) providing the token to the third party payment application for transaction processing.

12 Claims, 11 Drawing Sheets

Related U.S. Application Data (60) Provisional application No. 62/312,204, filed on Mar. 23, 2016, provisional application No. 62/149,304, filed on Apr. 17, 2015.

(56) References Cited

U.S. PATENT DOCUMENTS

| | | | |
|---|---|---|---|
| 9,767,452 B2* | 9/2017 | Khan | G06Q 20/02 |
| 9,867,043 B2 | 1/2018 | Aissi | |
| 10,185,949 B2* | 1/2019 | Clark | G06Q 20/401 |
| 10,243,958 B2 | 3/2019 | Chandoor et al. | |
| 10,699,274 B2* | 6/2020 | Peng | H04L 63/0823 |
| 10,769,624 B1* | 9/2020 | Gonzalez | G06Q 20/3672 |
| 11,062,302 B1* | 7/2021 | Ho | G06Q 20/227 |
| 2010/0318783 A1 | 12/2010 | Raj et al. | |
| 2013/0110658 A1 | 5/2013 | Lyman et al. | |
| 2013/0139230 A1 | 5/2013 | Koh et al. | |
| 2014/0031024 A1* | 1/2014 | Xie | G06Q 20/36 |
| | | | 455/418 |
| 2014/0101034 A1* | 4/2014 | Tanner | G06Q 20/10 |
| | | | 705/39 |
| 2014/0108263 A1* | 4/2014 | Ortiz | G06Q 20/36 |
| | | | 705/44 |
| 2014/0222682 A1* | 8/2014 | Dua | G06Q 20/322 |
| | | | 705/44 |
| 2014/0344153 A1 | 11/2014 | Raj | |
| 2015/0019443 A1 | 1/2015 | Sheets et al. | |
| 2015/0046339 A1* | 2/2015 | Wong | G06Q 20/4016 |
| | | | 705/44 |
| 2015/0081554 A1* | 3/2015 | Wong | G06Q 20/322 |
| | | | 705/35 |
| 2015/0327072 A1* | 11/2015 | Powell | H04L 63/10 |
| | | | 455/411 |
| 2015/0356560 A1 | 12/2015 | Shastry et al. | |
| 2015/0371234 A1* | 12/2015 | Huang | G06Q 20/20 |
| | | | 705/44 |
| 2016/0173483 A1 | 6/2016 | Wong et al. | |
| 2016/0364721 A1* | 12/2016 | Deliwala | G06Q 20/36 |
| 2017/0011396 A1 | 1/2017 | Desai et al. | |
| 2017/0017958 A1 | 1/2017 | Scott et al. | |
| 2017/0109745 A1 | 4/2017 | Al-Bedaiwi et al. | |
| 2017/0337542 A1 | 11/2017 | Kim | |
| 2019/0052645 A1 | 2/2019 | Sharma et al. | |

FOREIGN PATENT DOCUMENTS

| | | | |
|---|---|---|---|
| WO | 2013138195 | 9/2013 | |
| WO | WO-2015126753 A1 * | 8/2015 | G06Q 20/20 |

OTHER PUBLICATIONS

Anonymous, "Getting Started with Apple Pay In-App Provisioning," v. 1.23, Apple Technical Publication (Year: 2017).
Sabt et al., "Over-the-Internet: Efficient Remote Content Management for Secure Elements in Mobile Devices," IEEE Xplore, First Conference on Mobile and Secure Devices (Year: 2015).

* cited by examiner

SYSTEMS AND METHODS FOR FACILITATING PAYMENT APPLICATION PROVISIONING AND TRANSACTING

RELATED APPLICATIONS

The present application is a Continuation of U.S. patent application Ser. No. 15/131,979, filed Apr. 18, 2016, now U.S. Pat. No. 10,878,407, which claim priority to and the benefit of U.S. Provisional Patent Application Ser. No. 62/149,304 and U.S. Provisional Patent Application Ser. No. 62/312,204, the disclosures of which are hereby incorporated by reference in their entireties.

BACKGROUND OF THE INVENTION

1. Field of the Invention

The present invention generally relates to payment processing, and, more specifically, to systems and methods for facilitating payment application provisioning and transacting.

2. Description of the Related Art

With the onset of mobile electronic devices, a number of third parties have introduced electronic wallets for conducting transactions. These electronic wallets generally store credit card information for a customer so that the customer can use that information to conduct a transaction. Often, the credit card issuer has little or no control over the third party electronic wallet. This lack of control may extend to other payment devices, including chip-based credit cards, QR code payments, etc.

SUMMARY OF THE INVENTION

Systems and methods for facilitating third party payment application provisioning are disclosed. According to one embodiment, a method for provisioning a token to a third party payment application on a mobile device may include (1) receiving a logon from a customer using a mobile application for a financial institution executed on a mobile device and a device identifier for the mobile device; (2) receiving a request to provision a token for a third party payment application; (3) authenticating the customer using the logon information and the device identifier; (4) provisioning a token for a payment device associated with the customer; and (5) providing the token to the third party payment application for transaction processing.

In one embodiment, a merchant account may be linked to a verified customer.

In one embodiment, the token may be provided by secure application to application communication. In another embodiment, the token may be provided to a secure element of the customer's mobile device. In another embodiment, the token may be provided to a host system of the merchant (e.g., a cloud-based payment), and the customer's mobile device may access the token from the cloud.

In another embodiment, a token may also be provided via, for example, a service or API call. In another embodiment, a token may be embossed onto a chip, rendered in a QR code, etc. In one embodiment, "InApp" purchases may be supported. In another embodiment, online web-based purchases may be supported with the device optionally being leveraged to select the payment product and validate/verify the customer.

In one embodiment, alternate payment products, such as points, may be used. If there are insufficient points (or funds in the alternate funding source), the remaining portion of the transaction may be applied to one or more related accounts, one or more accounts of (the customer's choosing, a combination thereof, etc. (e.g., "split tender").

In one embodiment, the customer may be involved in the selection process, electing to use a closed-loop payment mechanism (e.g., ChasePay) or a network payment product if no closed-loop payment mechanisms are supported.

The issuer's process may support allowing the customer to elect to have the issuer decide which payment product to user based on the best APR, reward points, incentives, or some other offer or factor. In one embodiment, this may result in closed-loop transaction routing, or open-loop transaction routing, and it may involve any type of product the issuer offers.

In one embodiment, the representation of the cards/accounts in the wallet may be represented by a single item that groups multiple entries for each account.

Methods for provisioning a token for a financial account to a mobile payment application are disclosed. In one embodiment, the method may include (1) an issuer computer processor receiving, from a mobile electronic device, customer authentication information for a customer; (2) the issuer computer processor authenticating the customer based on the customer authentication information; (3) the issuer computer processor receiving, from a third party payment application, an identification of a financial account for token provisioning; (4) the issuer computer processor provisioning a token for the financial account; and (5) the issuer computer processor providing the token to the mobile application.

In one embodiment, the token may be a specific to a transaction domain. The transaction domain may be e-commerce, mobile payment, point-of-sale, open-loop, and closed-loop.

In one embodiment, the issuer computer processor may provision a plurality of tokens for the account. Each of the tokens may be specific to a different transaction domain.

In one embodiment, the token may be provided to a secure storage area of the mobile electronic device. In another embodiment, the token may be provided to the third party payment application by secure application-to-application communication.

According to another embodiment, a method for provisioning a financial instrument for a computer payment application may include (1) receiving, at a computer payment application executed by a computer processor of a mobile electronic device, an identification of a payment account to add to the computer payment application; (2) the computer payment application communicating the identification of the payment account to a payment server; (3) the payment server identifying an issuer associated with the payment account; (4) the payment server identifying an issuer computer application associated with the issuer; (5) the payment server redirecting the computer payment application to the issuer computer application; (6) the computer payment application causing the issuer computer application to launch; and (7) the computer payment application receiving a token for the payment account from the computer payment application.

In one embodiment, the token may be a specific to a transaction domain. The transaction domain may be e-commerce, mobile payment, point-of-sale, open-loop, and closed-loop.

In one embodiment, the computer payment application may receive a plurality of tokens for the account. Each token may be specific to a different transaction domain.

In one embodiment, the token may be provided to a secure storage area of the mobile electronic device.

According to one embodiment, a method for provisioning of an account may include (1) receiving, at a payment service, authentication information for a customer and an identification of an account to provision; (2) a payment service computer processor communicating a provisioning request to a token provisioning service provider for the account; (3) the payment service provider receiving, from the token provisioning service provider, a first token for open-loop transactions, and a second token for closed-loop transactions; and (4) the payment service causing a single financial instrument to be displayed for the first token and the second token in a payment application executed by a mobile electronic device.

In one embodiment, the method may further include the payment service provider communicating the authentication information to an issuer of the account.

In another embodiment, the method may further include the payment service computer processor requesting and receiving, from the token provisioning service provider an identification of at least one account to be provisioned.

According to one embodiment, a method for provisioning an account may include (1) receiving, at a payment service, authentication information for a customer and an identification of an account to provision; (2) a payment service computer processor communicating a first provisioning request to a token provisioning service provider for the account; (3) the payment service computer processor communicating a second provisioning request to a payment network for the account; (4) the payment service provider receiving, from the token provisioning service provider, a first token for closed-loop transactions; (5) the payment service provider receiving, from the payment network, a second token for open-loop transactions; and (6) the payment service causing a single financial instrument to be displayed for the first token and the second token in a payment application executed by a mobile electronic device.

In one embodiment, the method may further include the payment service provider communicating the authentication information to an issuer of the account.

In another embodiment, the method may further include the payment service computer processor requesting and receiving, from the token provisioning service provider an identification of at least one account to be provisioned.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-11.

Embodiments disclosed herein facilitate third party payment application provisioning and transacting. Rather than have a customer enter payment device information to a third party payment application, such as ApplePay, SamsungPay, etc., and the third party payment application requesting the provisioning of a token, in one embodiment, the customer may log into or otherwise access the issuer's mobile application and may request that the issuer provision one or more tokens for the third party payment application. After the user is authenticated, the issuer or a token manager may provision one or more token for one or more payment devices/accounts (e.g., credit card, debit cards, stored value cards, lines of credit, etc.) and may provide the token(s) to the third party payment app. In one embodiment, the token(s) may be provided by secure application-to-application communication, by storing the token(s) in a secure element/area of the mobile device, by storing the token(s) in the cloud, etc.

In one embodiment, a customer's card may be automatically tokenized and pushed to a third party wallet with which the issuer may have an agreement. For example, an issuer may have an agreement with a third party wallet provider that every new account that it opens will be automatically tokenized and pushed to the third party wallet (e.g., ApplePay, FacebookPay, etc.).

In one embodiment, each token may be a domain-specific token, such as for e-commerce transactions, mobile payments, point-of-sale transactions, open-loop transactions, closed-loop transactions, etc. In one embodiment, a token may be used with a combination of domains.

In one embodiment, the token(s) may be stored on the mobile device in, for example, a secure element. In another embodiment, the token(s) may be provisioned as necessary to conduct a transaction (e.g., on demand).

In one embodiment, the customer may be authenticated by logging into the issuer's mobile application, accessing the issuer's website, etc. The customer may be required to provide additional authenticating information, such as out-of-band information, biometric information, etc. A device identifier, such as a serial number, a MAC address, cookie, etc. may be checked to verify that the mobile device is registered to the user. Other device fingerprinting data may be used as is necessary and/or desired.

In another embodiment, the customer may be automatically authenticated based on verified past activity between the merchant and the issuer. For example, the customer may log into (password or thumbprint) an application on an electronic device, and based on that users history and a matching history on an issuer's backend, the customer's identity may be derived and access to their accounts may be granted.

In one embodiment, a token may be provided to a "Bot," a software application that runs automated tasks (scripts) over the Internet. For example, a customer may be "chatting" or otherwise conversing with a bot (e.g., Facebook Messenger), and the merchant, issuer, and/or third party bot provider may use, for example, natural language processing or a similar technique to determine from the context of the chat when the customer is ready to pay. The issuer may then provide a token for payment.

In one embodiment, the customer may also be able to manage token usage. For example, the customer may establish merchant and/or industry white lists or blacklists, time restrictions (e.g., no transactions between midnight and 6:00 am), transaction restriction (e.g., no transactions greater than $1,000, no transactions greater than $1,000 without additional authentication, etc.), geographical restrictions (e.g., no foreign transactions, no transactions where merchant location differs from mobile device location), device restrictions (e.g., no transactions with token that did not originate from the registered device), etc.

In one embodiment, if the token covers more than one payment device and/or account, the customer may set payment device/account preferences, defaults, etc. In one embodiment, the customer may have the payment device/account selected to maximize a benefit to the customer, such as maximizing rewards, grace periods, etc.

In one embodiment, the token may cover payment devices/accounts that the customer does not currently have with the issuer. As a new payment device/account is added, the customer may establish preferences for using that payment device/account.

In one embodiment, multiple tokens may be provisioned for each account. For example, one token may be used when the account is used in an open-loop payment network (e.g., VisaNet), and the other token may be used when the account is used in a closed-loop, or proprietary, payment network.

An example of a closed-loop or proprietary payment network is ChaseNet. Closed-loop or proprietary payment networks may communicate additional data, such as the device mobile device information, in addition to the payment device information and transaction information. They may also provide two-way communication from the merchant to the issuer that may provide portions of real-time authorization, portions of non-real time authorization, and combinations thereof.

Figure 1:
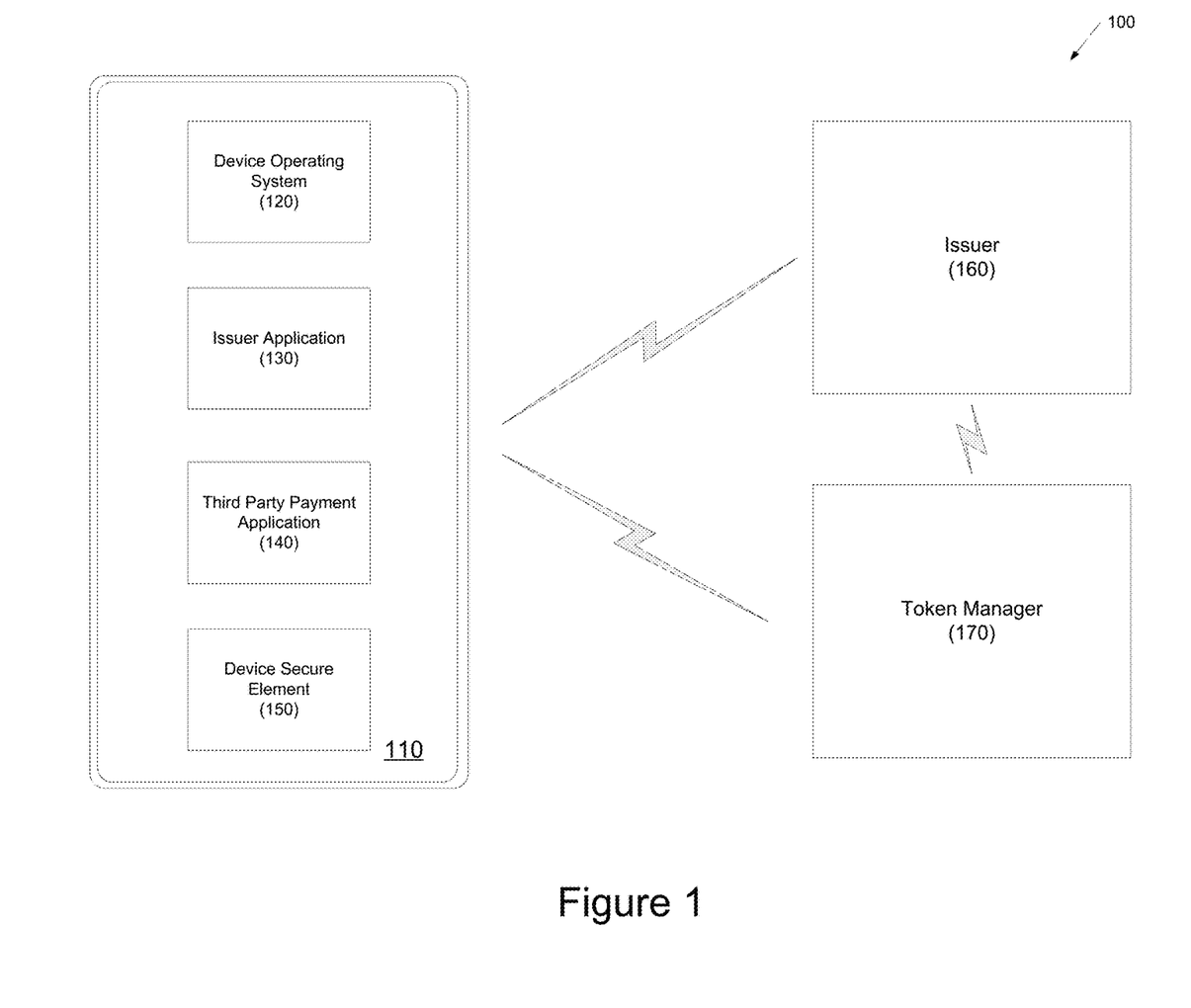
FIG. 1 depicts a system for facilitating third party payment application provisioning according to one embodiment.

Referring to FIG. 1, an exemplary system for facilitating third party payment application provisioning is disclosed according to one embodiment. Electronic device 110, which may be any suitable mobile electronic device (e.g., smartphones, tablet computers, notebook computers, Internet access devices, etc.), may include device operating system 120, issuer application 130, third party payment application 130, and a secure element/area 150. Electronic device 110 may further include one or more data busses, one of which may be a secure data bus.

Electronic device 110 may communicate with issuer 160 and/or token manager 170. In addition, issuer 160 and token manager 170 may communicate with each other. Any suitable communication network, including the Internet, intranets, payment networks, communication networks, etc. may be used as necessary and/or desired.

Figure 2:
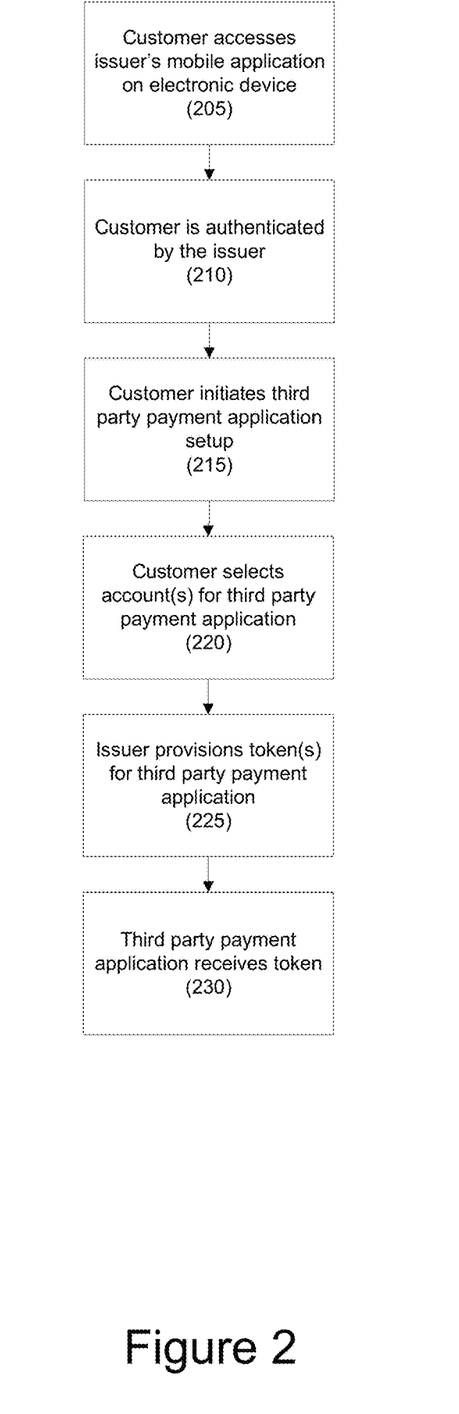
FIG. 2 depicts a method for facilitating third party payment application provisioning according to one embodiment.

Referring to FIG. 2, a method for facilitating third party payment application provisioning is disclosed according to one embodiment. In step 205, the customer may access the issuer's mobile application, website, etc. on an electronic device. In one embodiment, the customer may provide log-in information, such as a user name and password. Additional information, such as out-of-band information, biometric information, etc. may be requested at any time in the process.

In step 210, the customer may be authenticated by the issuer and/or the issuer's mobile application.

In step 215, the customer may initiate the third party payment application set up. In one embodiment, the customer may identify a particular third party payment application that he or she would like to provision a token for.

In step 220, the customer may select one or more account to provision one or more token for. In one embodiment, a token may be provisioned for each payment device/account; in another embodiment, a token may be provisioned for more than one payment device/account, and the issuer may refer to the customer's preferences in identifying a payment device/account for the transaction.

As discussed above, in one embodiment, multiple tokens may be provisioned for each account. For example, one token may be used when the account is used in an open-loop payment network (e.g., VisaNet), and the other token may be used when the account is used in a closed-loop, or proprietary, payment network.

In one embodiment, the customer may set up preferences for merchant whitelists/blacklists, time restrictions, geographical restrictions, industry restrictions, etc. In addition, the customer may specify a default payment device/account, conditions for using a specific payment device/account, etc. In addition, the customer may specify a goal (e.g., maximize rewards, maximize discounts, etc.) so that the issuer may identify the payment device/account in order to meet the customer's goals.

In one embodiment, the merchant may establish rules as to when to accept a closed-loop payment mechanism, when to accept the open-loop payment mechanism, etc. Other rules may be established as is necessary and/or desired.

In one embodiment, the customer may change the identification of the payment account of the pending transaction after the completion of that transaction. For example, a closed-loop credit transaction may be changed to points transaction, a loan, etc. internally during the authorization flow in real time, or during the clearing/settlement process after the transaction has completed.

In step 225, the issuer and/or the token manager may provision the token(s) for the third party payment application. In one embodiment, the issuer and/or the token manager may provide the token(s) to the issuer's wallet or mobile application. In another embodiment, the issuer and/or token manager may provide the token directly to the third party payment application.

In one embodiment, the token(s) may be stored on the mobile device in, for example, the mobile device's secure element, secure storage area, etc. In another embodiment, the token(s) may be provided to cloud storage, Host Card Emulation (HCE), embossed into plastic, etc. In still another embodiment, the third party payment application may be provided with a link to retrieve the token(s).

In another embodiment, the token(s) may not be provided to the mobile device until a transaction is initiated (e.g., on demand). In still another embodiment, the token(s) may not be provided to the mobile device, but may remain in centralized storage. Other ways of managing token storage may be used as is necessary and/or desired.

In step 230, if the third party payment application was not provided with the token(s), the token(s) may be communicated to the third party payment application by, for example, application-to-application communication. In one embodiment, this communication may be secure. In one embodiment, the token and/or other payment information may be provided via a service, an API, etc.

Figure 3:
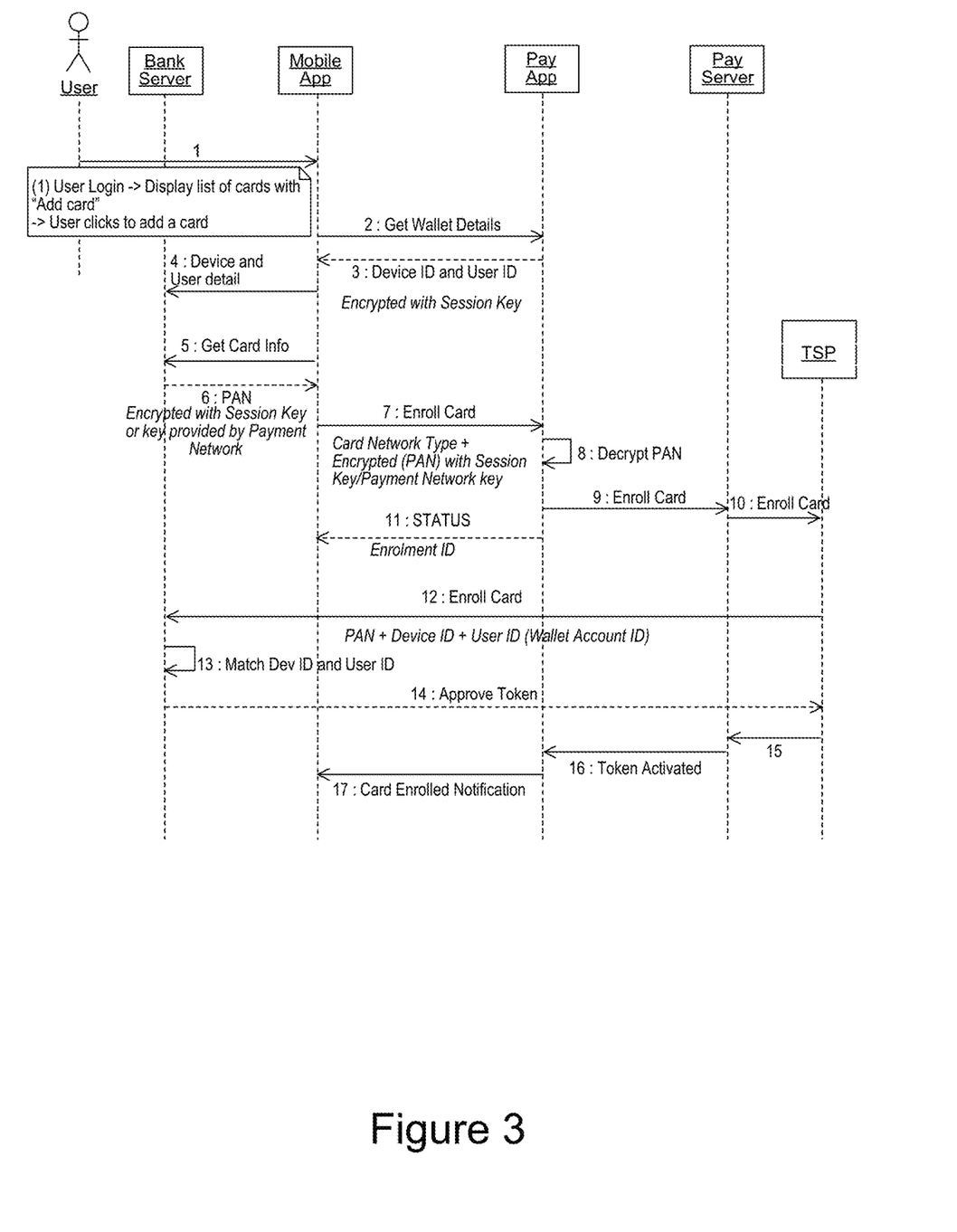
FIG. 3 depicts a process flow of the method of FIG. 2.

An exemplary detailed process flow involving a user, a bank server, a mobile application, a payment application or wallet, a payment application or wallet server, and a token provisioning service provider (TSP), is provided in FIG. 3.

Figure 4:
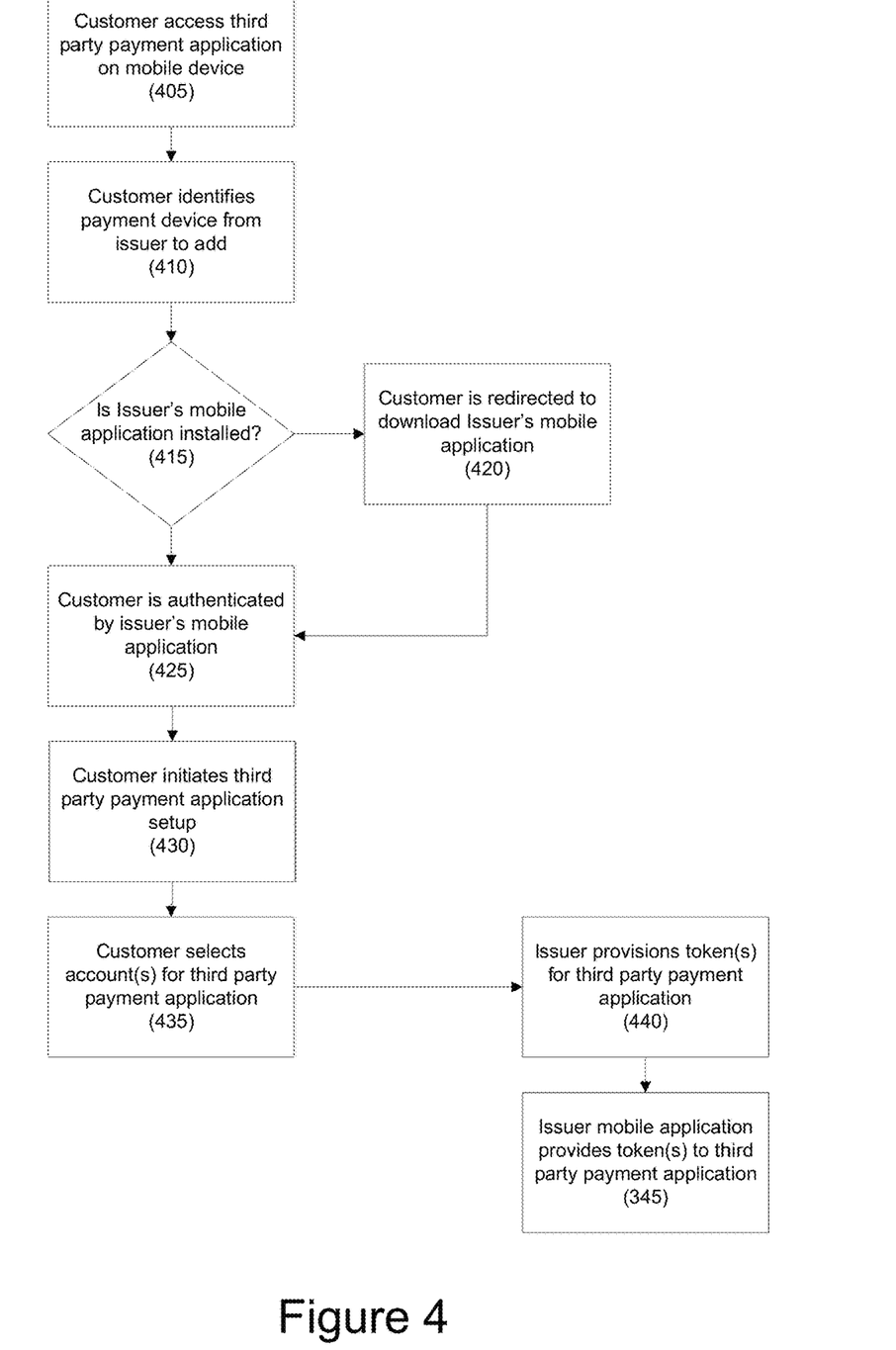
FIG. 4 depicts a method for third party payment application provisioning according to another embodiment.

Referring to FIG. 4, a method for facilitating third party payment application provisioning is disclosed according to another embodiment.

In step 405, the customer may access a third party payment application on the customer's mobile device. In one embodiment, the customer may be authenticated by the third party payment application by providing a username, password, etc. Additional authenticating information may be required as is necessary and/or desired.

In step 410, the customer may identify a payment device/account and/or an issuer to add to the third party payment application. In one embodiment, the customer may not provide any payment device/account identifying information, but may instead select a type of payment device (e.g., a credit card) and an issuer.

In step 415, a check may be made to see if the issuer's mobile application is installed on the customer's mobile device. If it is not, in step 420, the customer may be redirected to download the issuer's mobile application, and may complete the installation process. In one embodiment, the customer may be redirected to the issuer's mobile site to complete the process.

In step 425, the customer may be authenticated by the issuer and/or the issuer's mobile application. This may be similar to step 210, above.

In step 430, the customer may initiate the third party payment application set up. This may be similar to step 215, above.

In step 435, the customer may select one or more accounts to provision one or more token for. This may be similar to step 220, above.

In step 440, the issuer and/or the token manager may provision the token(s) for the third party payment application. This may be similar to step 225, above.

In step 445, if the third party payment application was not provided with the token(s), the token(s) may be communicated to the third party payment application by application-to-application communication. This may be similar to step 230, above.

Figure 5:
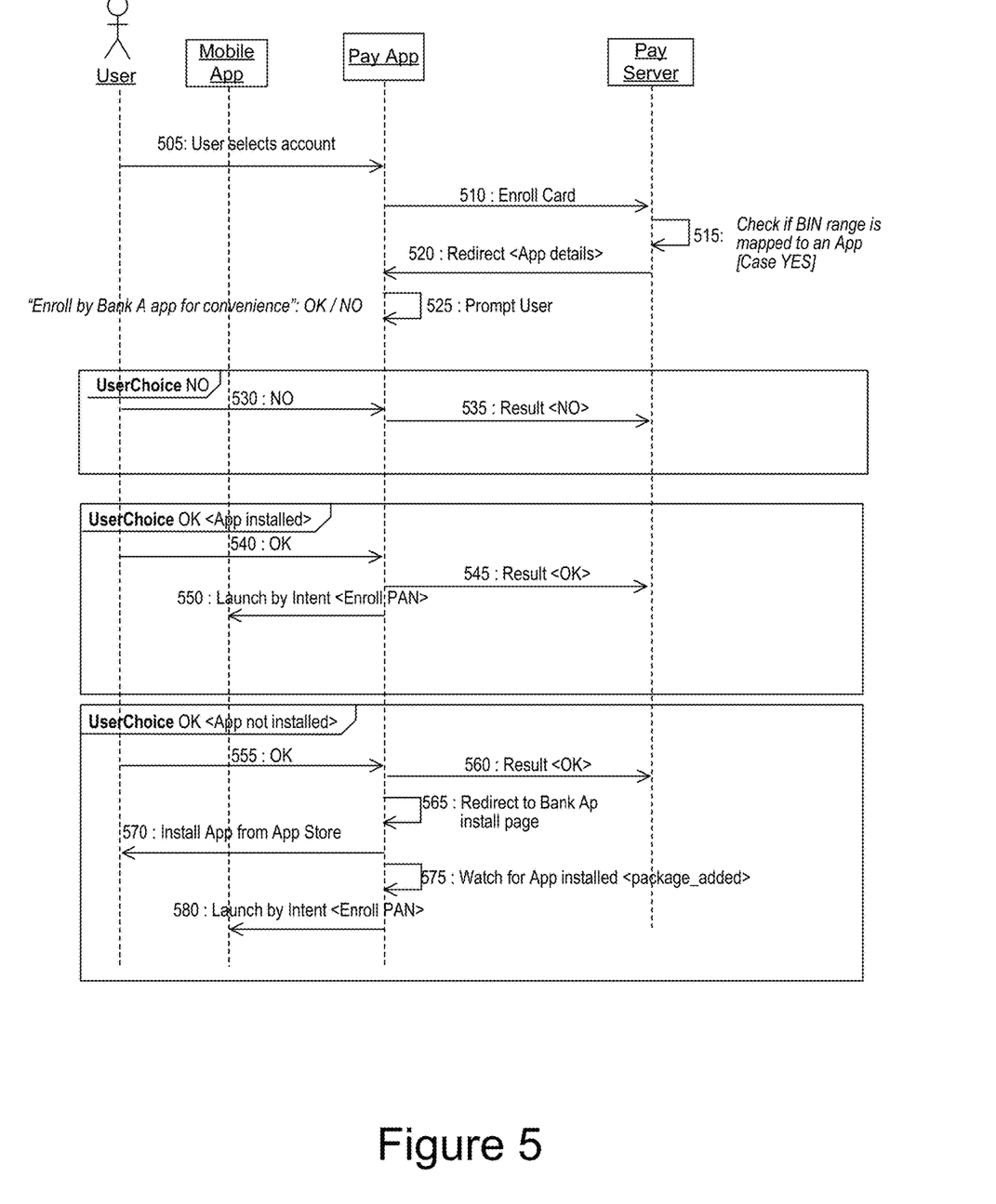
FIG. 5 depicts a process flow of the method of FIG. 4.

An exemplary detailed process flow is provided in FIG. 5.

In one embodiment, in step 505, the user may identify a card, account, etc. to enroll with the payment application. In step 510, the payment application may communicate the card, account, etc. to a payment server which, in step 515, may then determine if the card, account, etc. is associated with a mobile application. For example, the payment server may check the bank identification number, or BIN, of a credit card to determine the issuer, and may identify that issuer's mobile application.

In step 520, the payment server may redirect the payment application to the identified mobile application, and in step 525, the user may be prompted with the option to enroll using the application. For example, the user may be presented with a message such as "Enroll by Bank A application for convenience?" and given the option to respond with a yes/ok or no.

If, in step 530, the user responds "no," (UserChoice NO) in step 535, no additional action is taken.

If, in step 540, the user responds "yes" or "ok," and the mobile application is already installed (UserChoice OK <App installed>), in step 545, the payment application may inform the payment sever, and in step 550, the payment application may execute the mobile application. The user may then continue with a provisioning process such as that described herein.

If, in step 555, the user responds "yes" or "ok," and the mobile application is not installed (UserChoice OK <App not installed>), in step 560, the payment application may inform the payment sever, and in step 565, the payment application may redirect the user to the mobile application install page, an "app store," etc. In step 570, the mobile application may then be installed. In step 575, once the mobile application is installed, in step 580, the mobile application may be executed. The user may then continue with a provisioning process such as that described herein.

Figure 6:
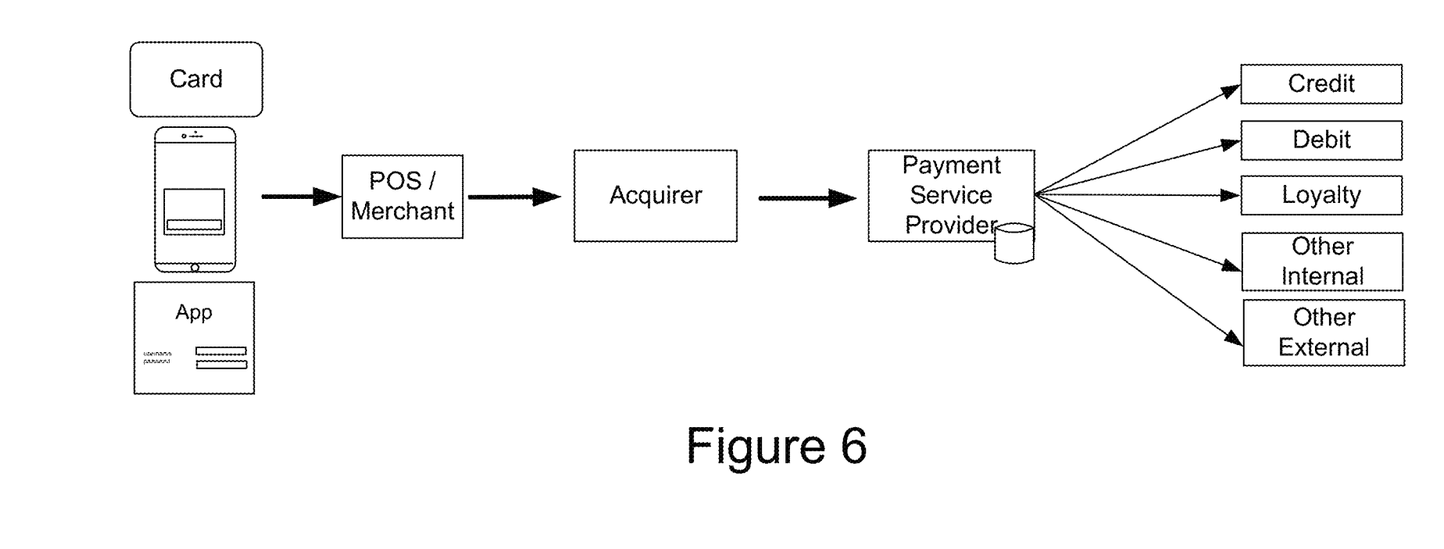
FIG. 6 generally depicts closed-loop processing according to one embodiment.

Referring to FIG. 6, an illustration of closed-loop processing is disclosed according to one embodiment. In one embodiment, the acquirer and the payment service provider are under the control of, associated with, or have relationships with a financial institution (e.g., an issuer of the financial instrument).

In closed-loop processing, a transaction may route directly from the merchant's acquirer to a financial institution's payment service provider. This direct routing may allow the financial institution and/or its partners to not only set processing rules and fees, but also introduce new, non-traditional funding sources for the transaction without impacting the merchant.

Figure 7:
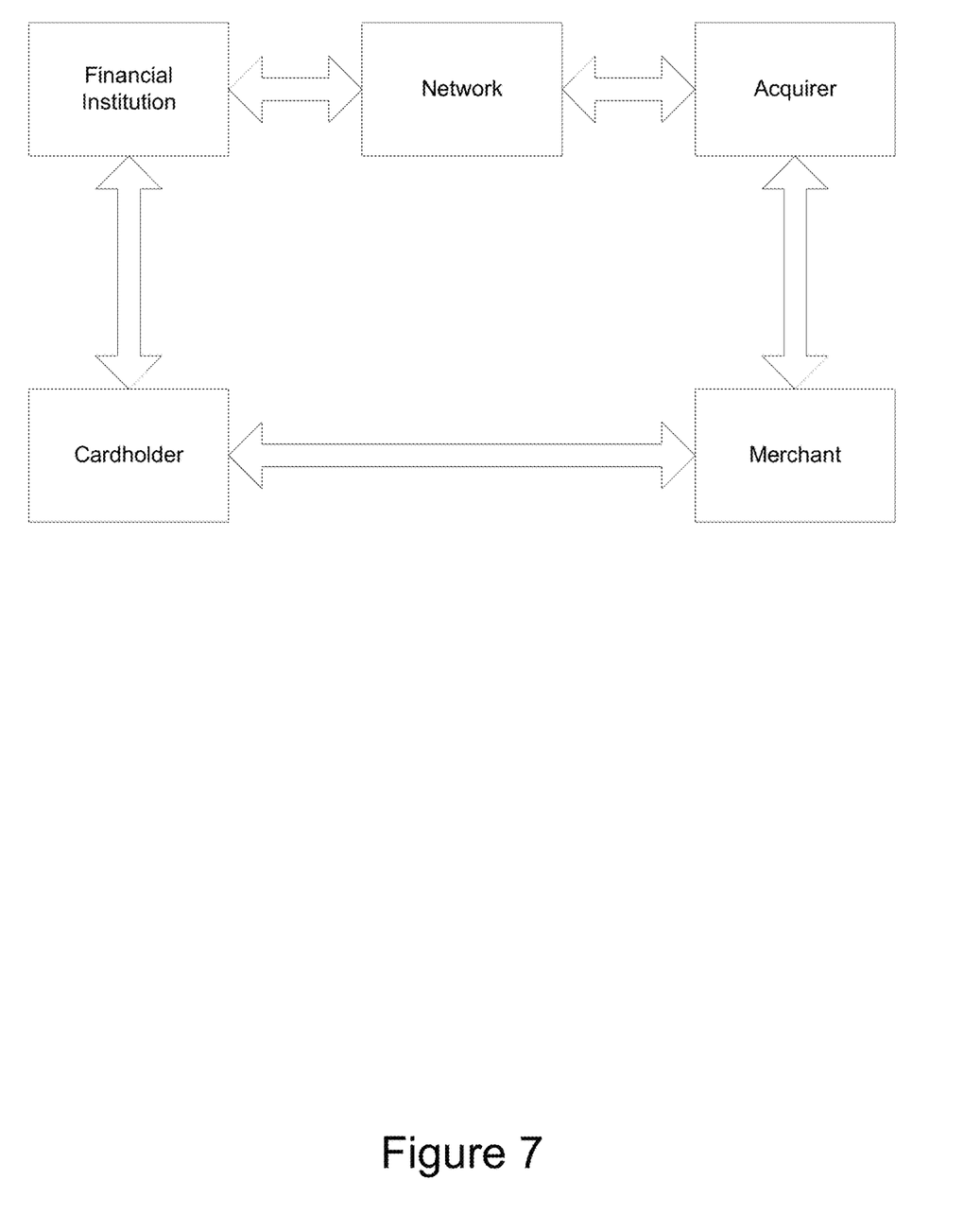
FIG. 7 depicts closed-loop processing according to one embodiment.

FIG. 7 depicts a traditional multi-party model that may have limited support for a three-party model using, for example, Visa hosted ChaseNet. In one embodiment, the network provider (e.g., Visa) may provide the financial institution with economics and rules flexibility; the financial instruments may be limited to cards issued by the network provider.

Figure 8:
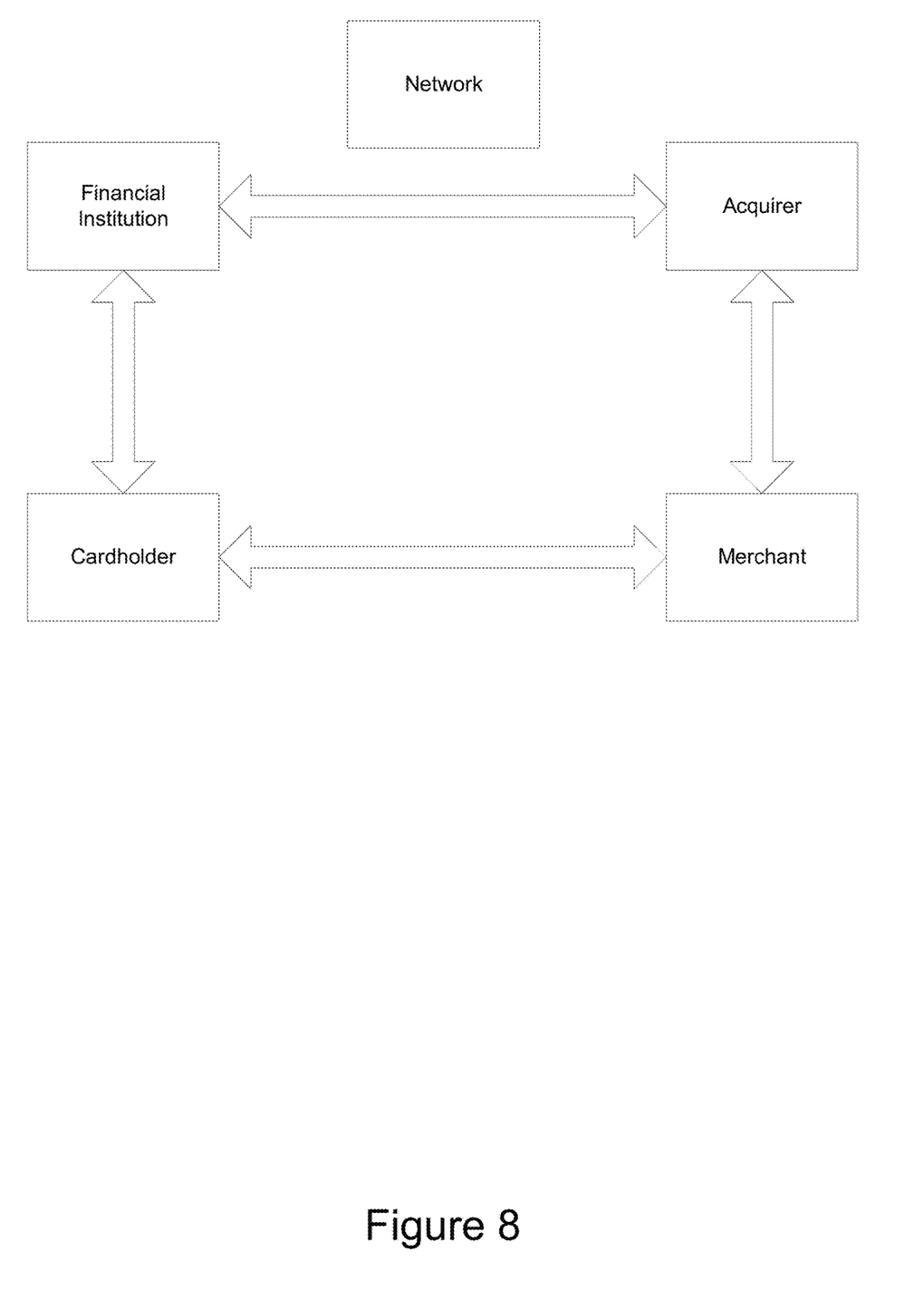
FIG. 8 depicts closed-loop processing according to another embodiment.

FIG. 8 depicts an illustration of closed-loop processing according to another embodiment. In one embodiment, authorizations may occur through the acquirer, and clearing/settlement may be director back through the acquirer. As indicated, the network a traditional payment network) is not used in a closed-loop transaction.

Presently, customer authentication may be determined by the issuer and data provided during the process may be used to help access the risk level. The manner of customer authentication may be managed by the issuer and authentication results may be provided back to the network. In one embodiment, leveraging the payment networks may result in the wallets and issuers being used in open-loop solution. Thus, another path may be required to support closed-loop provisioning.

In one embodiment, the financial institution may use a dedicated ISO BIN that causes acquirers to route directly to the financial institution.

Figure 9:
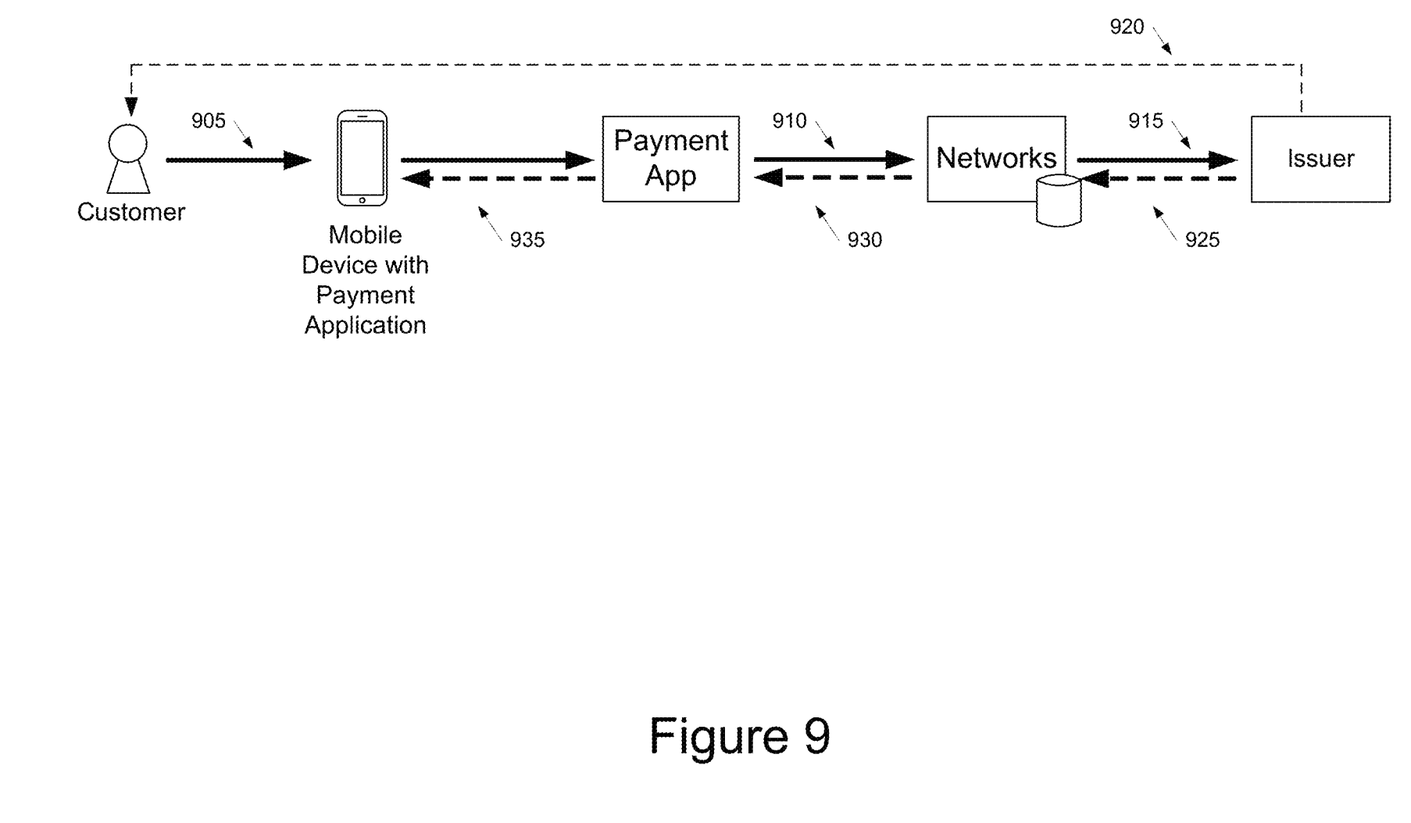
FIG. 9 depicts a provisioning process according to one embodiment.

An example of current provisioning is provided in FIG. 9. In one embodiment, in step 905, a customer may request to provision an account into a wallet or payment application. In steps 910 and 915, the wallet/payment application may interact with the networks to check the product and validate the customer with the issuer. In step 920, the issuer may check for product eligibility and may validate the customer directly. The request may be approved or denied. In steps 925, 930, and 935, the token may then be provided to the mobile device.

Figure 10:
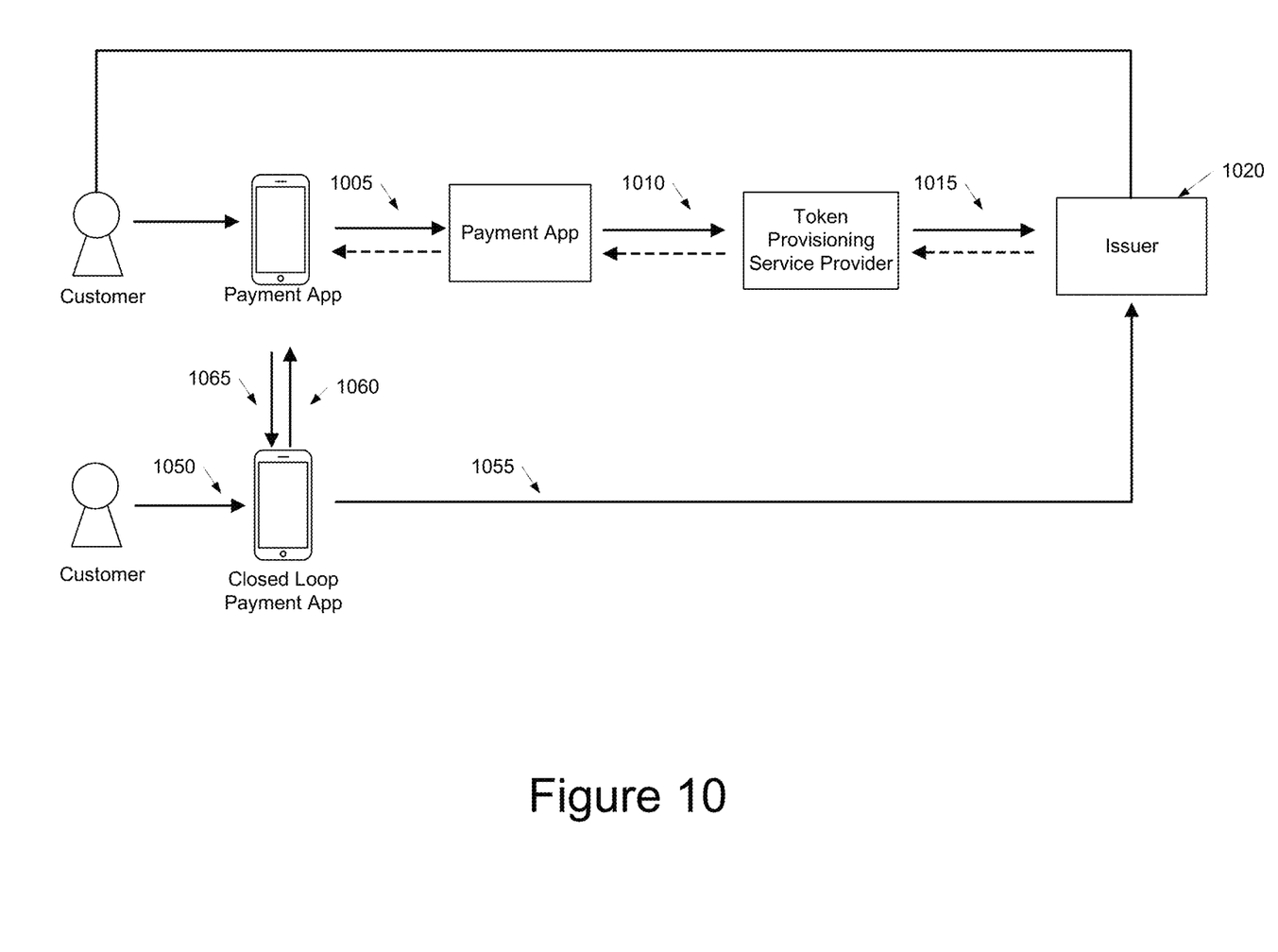
FIG. 10 depicts a customer authentication process is disclosed according to one embodiment.

Referring to FIG. 10, a customer authentication process is disclosed according to one embodiment.

In one embodiment, the authentication process may be initiated using a wallet or payment application. For example, in step 1005, the customer may choose to add a financial instrument products to a Wallet/Payment App by selecting from a list of supported issuers. In step 1010, the Wallet/Payment App may then contact the Service Provider to obtain the authentication processes supported by the issuer. The Service Provider may return to the Wallet/Payment App a list of supported methods (Web, App, or both). In step 1015, the Wallet/Payment App may then invoke the authentication process directly or through the Service Provider. In step 1020, once the customer has been authenticated the Issuer may return a list of accounts to the Wallet/Payment App through the Service Provider.

In another embodiment, the authentication may be initiated by the issuer using, for example, a closed-loop payment application, such as ChasePay, or by using the issuer's website. For example, in step 1050, the customer may log into the issuer's payment application or website. In step 1055, the customer may be authenticated by the issuer. In step 1060, the issuer may invoke the payment app and the customer's accounts may then be loaded into the payment app. In step 1065, the issuer may send a message to the Wallet/Payment App to initiate the process for an authenticated customer. The issuer may also update its systems and the Service Provider so the process would move forward without requiring the customer to re-authenticate.

Figure 11A:
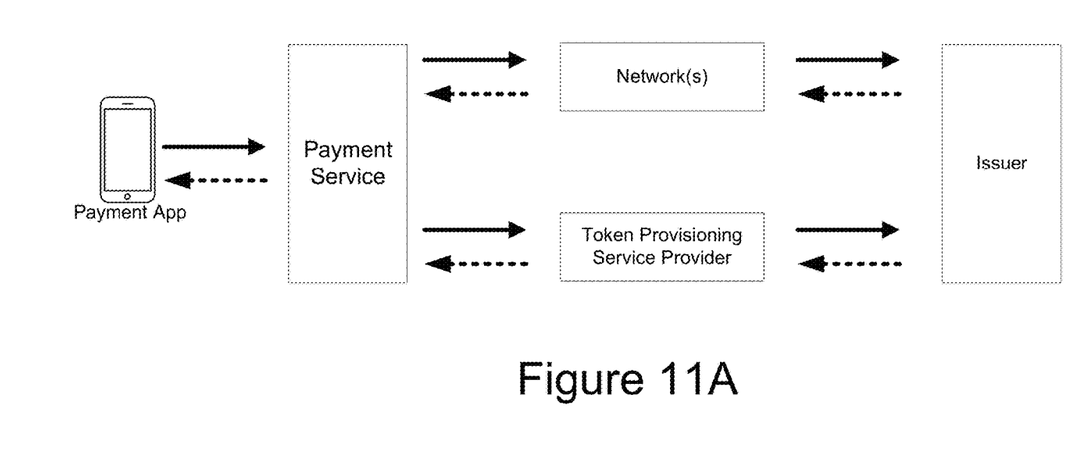
FIGS. 11A and 11B depict exemplary methods for independent and combined financial instrument provisioning according to embodiments.
Figure 11B:
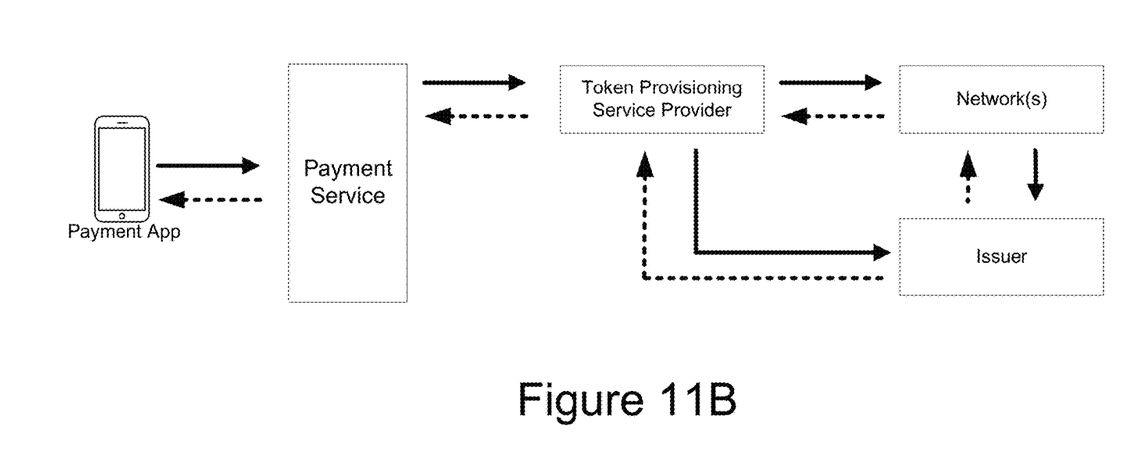

Referring to FIGS. 11A and 11B, multiple provisioning process is disclosed according to embodiments. Provisioning both open-loop, closed-loop or other versions of an account into a wallet or payment application so they appear as a single card may be done by independent provisioning (FIG. 11A), or by combined provisioning (FIG. 11B).

Independent provisioning may refer to a process by which a payment service takes the data received during the customer authentication to obtain the list of accounts that are to be provisioned. The payment service then sends two provisioning request for each account (one to the Networks and one to a Token Provisioning Service Provider). Once provisioning has completed a single card will show in the payment app for each set of tokens retrieved.

With combined provisioning, the payment service takes the data received during the customer authentication to obtain the list of accounts that are to be provisioned. The payment service then sends single request to the Token Provisioning Service Provider for each account. The Token Provisioning Service Provider then provisions that account into both formats (open and closed). Once provisioning has completed, a single card will show in the payment app for each set of tokens received.

In one embodiment, the single card option may be a card reference, or another product reference e.g., ChasePay) where the later could hold any number of accounts. In another embodiment, multiple cards may be displayed as well.

Referring to FIG. 12, the POS and device may interact to select the supported payment mechanism (e.g., ChasePay or Paywave). Both devices need to support a closed-loop payment system, such as Chase Pay, in order to run a closed-loop transaction. If either side does not contain the closed-loop payment system data, then in one embodiment, both devices may downgrade to an open-loop transaction.

In one embodiment, if both the open-loop and closed-loop payment mechanisms are available, the point of sale device and/or a merchant backend may select the payment mechanism to use. For example, the merchant may select the payment mechanism that gives reduced or waived acquisition fees, reduced or waived network fees, reduced or waived chargeback fees, monetary incentives, a combination thereof, etc. In one embodiment, the point of sale device may cause the selected payment mechanism to be displayed to the customer, and the customer may approve the selected payment mechanism or select a different payment mechanism.

In one embodiment, the customer may be involved and may actively select which payment mechanism to try first, and which to try secondly. The customer may select the payment mechanism that provides a discount on the transaction, a reward, earns a higher status in a loyalty program, has the lowest interest rate, has the highest credit limit, provides a promotion (e.g., installment payments, reduced/no interest rate, deferred interest, etc.), provided a value-added feature (e.g., convenience associated with shipping address information and/or payment information is on file), etc.

The disclosures of U.S. patent application Ser. Nos. 62/149,304; 62/312,204; 15/069,418; and 15/069,458 are hereby incorporated, by reference, in their entireties.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenia operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other, remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for provisioning a token for a financial account of a user to a payment application executing on a mobile device of the user, comprising:
    an issuer computer server receiving a request from an issuer computer application installed on a mobile electronic device of the user to provision the token for the financial account, wherein the request is in response to a prompting message from the payment application, wherein the request comprises an identification of the payment application, and a device identifier for the mobile electronic device, and an identifier of the financial account, wherein the prompting message is in response to the payment application:
        detecting the installation of the issuer computer application on the mobile electronic device; and
        if the installation is detected, causing the issuer computer application to launch; or
        if the installation is not detected, prompting the user of the mobile electronic device to download and install the issuer computer application;
    the issuer computer server receiving, from the issuer computer application installed on the mobile electronic device of the user, authentication information of the user provided by the user to the issuer computer application, wherein the user is a customer of the issuer;
    the issuer computer server authenticating the user based on the authentication information of the user;
    the issuer computer server provisioning the token for the payment application;
    the issuer computer server providing the token for the payment application to the issuer computer application; and
    the issuer computer application providing the token for the payment application to the payment application by secure application-to-application communication.

2. The method of claim 1, wherein the token is a specific to a transaction domain.

3. The method of claim 2, wherein the transaction domain is one of ecommerce, mobile payment, point-of-sale, open-loop, and closed-loop.

4. The method of claim 1, wherein the issuer computer server provisions a plurality of tokens for the financial account.

5. The method of claim 4, wherein each of the plurality of tokens is specific to a different transaction domain.

6. The method of claim 1, wherein the token is provided to a secure storage area of the mobile electronic device.

7. A method for provisioning a financial instrument for a computer payment application, comprising:
    receiving, at a payment application including an electronic wallet, and executed by a computer processor of a mobile electronic device, an identification of a payment account to add to the electronic wallet;
    the payment application communicating the identification of the payment account to a payment server;
    the payment server identifying an issuer associated with the payment account;
    the payment application detecting an installation of an issuer computer application on the mobile electronic device, and
        (i) if the installation is detected, causing the issuer computer application to launch, or
        (ii) if the installation is not detected, prompting a user of the mobile electronic device to download and install the issuer computer application and then causing the issuer computer application to launch;
    the payment server redirecting the payment application to the issuer computer application;
    the issuer computer application receiving a token for the payment account that is provisioned for the electronic wallet; and
    the payment application receiving the token for the payment account from the issuer computer application.

8. The method of claim 7, wherein the token is a specific to a transaction domain.

9. The method of claim 8, wherein the transaction domain is one of ecommerce, mobile payment, point-of-sale, open-loop, and closed-loop.

10. The method of claim 7, wherein the computer payment application receives a plurality of tokens for the payment account.

11. The method of claim 10, wherein each of the plurality of tokens is specific to a different transaction domain.

12. The method of claim 7, wherein the token is provided to a secure storage area of the mobile electronic device.

* * * * *